United States Patent [19]

Graham et al.

[11] Patent Number: 4,481,001
[45] Date of Patent: Nov. 6, 1984

[54] HUMAN SKIN MODEL FOR INTRADERMAL INJECTION DEMONSTRATION OR TRAINING

[75] Inventors: Thomas E. Graham, Santa Clara; Eric E. Sabelman, Menlo Park, both of Calif.

[73] Assignee: Collagen Corporation, Palo Alto, Calif.

[21] Appl. No.: 498,292

[22] Filed: May 26, 1983

[51] Int. Cl.³ ............................................. G09B 23/30
[52] U.S. Cl. .................................................... 434/267
[58] Field of Search ................. 434/262, 267, 268, 272

[56] References Cited

U.S. PATENT DOCUMENTS 3,226,846  1/1966  Wood .................................. 434/272
3,339,290  9/1967  Doyle .................................. 434/267
3,722,108  3/1973  Chase .................................. 434/267

OTHER PUBLICATIONS

Sejrsen, P., Danish Med. Bul., 18 (Suppl), pp. 1-38, (1971).

Primary Examiner—Harland S. Skogquist
Attorney, Agent, or Firm—Ciotti & Murashige

[57] ABSTRACT

A skin model for use in demonstrating or practicing intradermal injection of fluids is disclosed. The model is a composite laminate of: (1) a subcutaneous tissue-simulating layer made of a foamed elastomer of low compression deflection and hardness; (2) a dermis-simulating layer of about 1 to 3 mm thick of that is substantially nonporous has a slightly greater hardness than the subcutaneous tissue-simulating layer and a penetration value in the range of 30 to 100 mm and is made of a silicone elastomer that contains reinforcing fibers, and, optionally, flesh tone pigment; and (3) in epidermis-simulating layer about 0.1 to 1 mm thick made of a high tear strength, high tensile strength elastomer. One or more of the layers may be contoured so that the surface of the model is shaped to simulate contour defects in natural skin.

11 Claims, 5 Drawing Figures

HUMAN SKIN MODEL FOR INTRADERMAL INJECTION DEMONSTRATION OR TRAINING

DESCRIPTION

1. Technical Field

This invention is in the field of medical training devices. More particularly it relates to a human skin model for demonstrating or practicing injecting fluids intradermally.

2. Background Art

ZYDERM ® collagen implant is a collagenous fluid that is used as a soft tissue replacement for correcting certain soft tissue defects. While the implant may be implanted safely into all soft connective tissue planes subjective clinical evaluation suggests that superficial intradermal implantation gives the most satisfactory results for contour deficiencies. Also, maximum distension of the epidermal tissue at the defect site is desirable. The plane of injection and the amount injected are, therefore, important factors in the successful use of ZYDERM ® collagen implant. Accordingly, there is a need for a convenient means to demonstrate how to inject this product and to enable medical personnel to practice injecting it.

A main object of the present invention is to provide a synthetic human skin model that may be used to demonstrate or practice injecting ZYDERM ® collagen implant intradermally. Although the model was designed with this specific use in mind it may also be used to demonstrate or practice injecting any other fluid intradermally such as steroid formulations, radioisotopes for blood flow measurement (Sejvsen, P. Dan Med Bul, 18(suppl) 1-38, (1971)) or allergy testing formulations which are commonly administered intradermally.

Applicants are aware of suture models for practicing suturing vessels or wounds and various artificial skin compositions that have been used or proposed for wound treatment. They are not aware of any prior skin models for intradermal injection demonstration or training.

DISCLOSURE OF THE INVENTION

The invention is a human skin model for demonstrating or practicing injecting fluids intradermally comprising a composite laminate of:
 (a) an elastomeric subcutaneous tissue-simulating layer having a reticulated porous structure;
 (b) a dermis-simulating layer about 1 to 3 mm thick having a substantially nonporous structure and made of a silicone elastomer gel containing a fibrous reinforcing material; and
 (c) an epidermis-simulating layer about 0.1 to about 1 mm thick made of a high tear strength, high tensile strength elastomer, the nature of the interface between the epidermis-simulating layer and the dermis-simulating layer being such as to permit fluid injected into the interface to flow at the interface and distend the epidermis-simulating layer.

MODES FOR CARRYING OUT THE INVENTION

Figure 1:
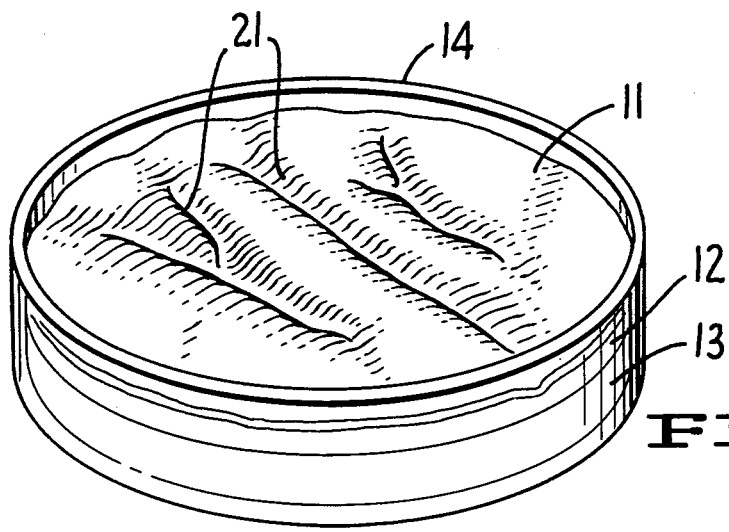
FIG. 1 is a perspective view of an embodiment of the skin model of the invention.

Referring to the drawings, the skin model of the invention is composed of three basic layers: (1) a subdermal tissue-simulating layer 11; (2) a dermis-simulating layer 12; and (3) an epidermis-simulating layer 13. The model is contained in a shallow dish-shaped container 14. When packaged for storage the container will be fitted with a hermetically sealed lid or peel off cover (not shown). The layers of the model are intended to simulate the physical properties of the skin and underlying tissue, such as thickness, tensile properties, and porosity, that are relevant to the act of injecting fluids intradermally. It is not intended to simulate skin as regards chemical composition or biological properties.

The subcutaneous tissue-simulating layer is made of a synthetic or natural elastomer such as natural rubber, styrene-butadiene rubber, styrene-butadiene-acrylonitrile rubber, polyisobutene, polyisoprene, silicone, polyetherurethane and polyurethane. The thickness of the layer is not critical. For practical reasons it will typically be in the range of about 3 to about 10 mm. The layer has a reticulated porous structure. The interconnecting network of pores 16 (FIG. 2) permits fluid to be injected into the layer without causing substantial dimensional change (ie, noticable bulging) of the layer. The pore size of the voids in the layer will usually be in the range of about 0.1 to about 1 mm. The pore volume of the layer will depend upon the stiffness of the elastomer and will usually be in the range of 50% to 95%. The density of this layer will usually be in the range of about 1 to about 5 lb/ft$^3$. The pores may be formed in the layer by the addition of a foaming agent to the elastomer. Upon curing the foaming agent converts to a gas and forms interconnecting pores in the elastomer matrix. Alternatively, the layer can be a preformed foam sheet which is die cut to the proper diameter and glued to the bottom of the container. The layer has a Durometer hardness (Shore A scale) in the range of about 1 and about 3 and a compression deflection (measured at 25% deflection) of less than about 1 psi, usually in the range of 0.3 and 1 psi.

The dermis-simulating layer is also made of an elastomer, preferably silicone rubber because the tensile strength of silicone rubber is easily varied and reproduced. The dermal layer is superficial to the subcutaneous tissue-simulating layer and is dense (substantially nonporous) relative to the latter. It is preferably bonded to the subdermal tissue layer by a high strength bond. If the inherent bond strength between the layers is not sufficient a bonding agent (adhesive) may be placed at the interface between the layers. The thickness of the dermal layer approximates that found in natural skin and will usually be in the range of about 1 to about 3 mm, preferably about 1 to about 2 mm. A fibrous material 17 is distributed homogenously in the layer as a tensile strength reinforcer. Conventional high strength synthetic polymer fibers such as fibers made of polyamides (nylons), polycarbonates, polyesters, polyolefins, halogenated polyolefins, and modified celluloses (rayons) may be used. Individual fibers may be up to one cm in length, but will typically be about 1 to about 4 mm in length. They will usually have diameters (or nominal diameters in the case of noncylindrical fibers) in the range of about 10 to 250 μm, preferably 50 to 100 μm. The fibers will usually constitute about 1% to about 20% by weight, more usually 1% to 5% by weight of the layer. The dermal layer has a Durometer hardness in the range of about 2 and about 10, a penetration value in the range of about 30 and about 100 mm, a tensile strength in the range of about 150 to about 300 psi and an elongation of about 100% and about 200%. Of these physical properties hardness and penetration value are most important. The layer will preferably be semi-opaque and may optionally include a human flesh tone pigment (oil base or dry powder earth pigments) for aesthetic purposes.

The superficial surface of the dermal layer is optionally coated with a thin layer of an elastomer, again preferably a silicone that has a higher tensile strength, hardness, elongation and tear strength than the dermal layer. The purpose of this superficial coating is to provide support for the superficial portion of the dermal layer and sufficient rigidity to prevent the fluid injected above this layer from unduly sagging into the dermal layer. This superficial coating will usually have a tensile strength in the range of about 700 and about 800 psi, a Durometer hardness in the range of about 25 to about 40, an elongation in the range of about 500% and about 700% and a tear strength in the range of about 85 and 120 lb/in.

The uppermost layer of the model, the epidermis-simulating layer, is made of a a high rupture strength, distensible, high tensile strength elastomer. Natural rubber latex is preferred. The bond between it and the overcoated dermal layer should be sufficiently weak such that it will partially separate from the dermal layer to permit it to distend to accomodate fluid injected at or near the dermo-epidermal junction. The junction may contain areas of stronger bonding to simulate indurated scar tissue areas. Its thickness approximates the thickness of human epidermis and will, accordingly, typically be in the range of about 0.1 to about 1 mm, more usually about 0.1 to about 0.5 mm. The tear strength of the layer is such as to permit puncture by a medium gauge needle without splitting. The tear strength will usually be in the range of about 110 and about 150 lb/in. The in plane tensile strength of the epidermal layer is such as to provide resistance (back pressure) to fluid injection on the order of the resistance that occurs in natural skin. The tensile strength of the epidermal layer will usually be in the range of about 3000 and about 4500 psi. It will also typically have a Durometer hardness in the range of about 25 and about 45 and an elongation in the range of about 750% and about 950%. Fibrous reinforcing materials, such as those used in the dermal layer, may be included in the epidermal layer if the elastomer itself does not provide suitable tensile strength. The layer preferably is semi-transparent and has a non-tacky, skin-like texture. It may optionally be tinted with flesh tone pigment. The edge of the epidermal layer is preferably bonded to the inner surface of the container (or to an underlying layer if it has a smaller area than the underlying layers) so that the epidermal layer is under a slight tension similar to that of natural skin.

Figure 2:
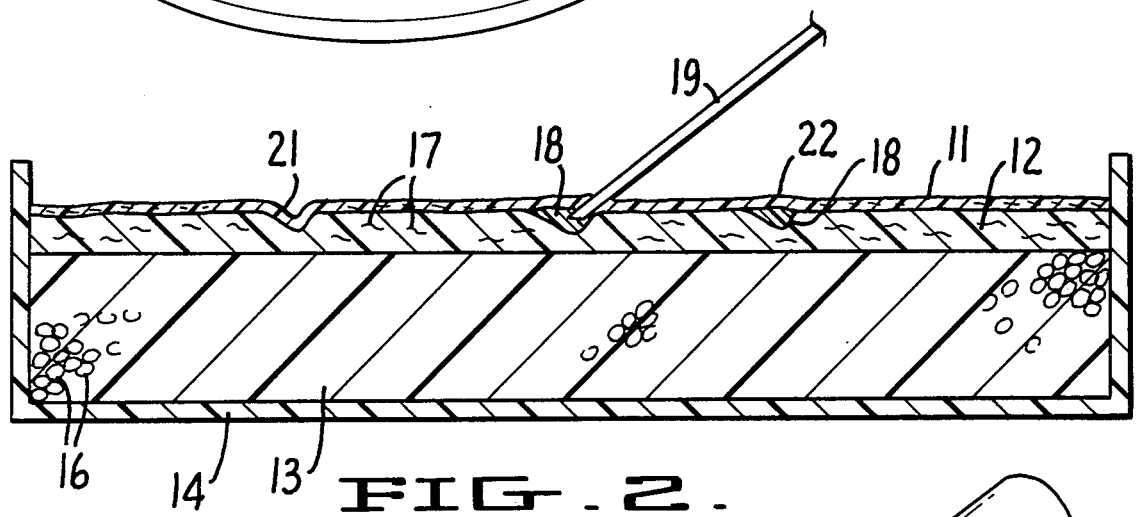
FIG. 2 is a sectional view of the model of FIG. 1 showing ZYDERM ® collagen implant being injected into the model at the dermal tissue plane.

FIG. 2 shows the model being used to demonstrate or practice injecting ZYDERM ® collagen implant intradermally. The implant material, designated 18, is contained in a syringe 19 (shown partially). The syringe needle is inserted through the epidermal layer at a slight angle thereto so that the end of the needle lies at or near the dermo-epidermal junction. In this regard one or more of the model layers may be contoured to simulate contour defects in skin such as wrinkles, glabellar frown lines, acne scars, atrophy-caused irregularities, post-rhinoplasty irregularities, nasolabial folds, cleft lip irregularities and the like. The model may also be configured to resemble a particular area of the facial anatomy, if desired. The model shown in the drawings includes such surface irregularities, generally designated 21. When the model is contoured to simulate such defects the model may be used to demonstrate or practice injection procedures for correcting same such as "multi-puncture", "fanning", "line-following" or "threading" injection techniques.

Figure 3:
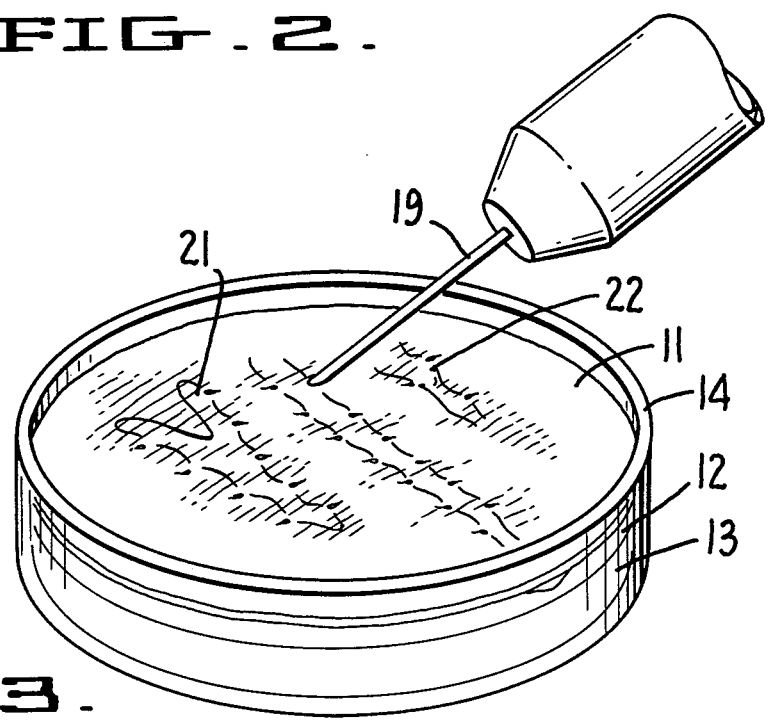
FIG. 3 is a perspective view of the skin model after a small sample of ZYDERM ® collagen implant has been implanted in the model.

Once the syringe needle is inserted at the desired location and appropriate depth, the syringe plunger is pressed to expel the desired volume of fluid from the needle tip into the dermal layer. The pressure exerted at the dermo-epidermal interface causes the dermal and epidermal layers to separate, thereby permitting the fluid to flow into the interface and distend the epidermal layer at the injection site. Such distension forms a bubble 22 in the surface of the model (FIG. 3). This bubble formation simulates the distension and blanching that occurs in natural skin when ZYDERM ® collagen implant is injected to the desired maximum tissue distension level.

Figure 4:
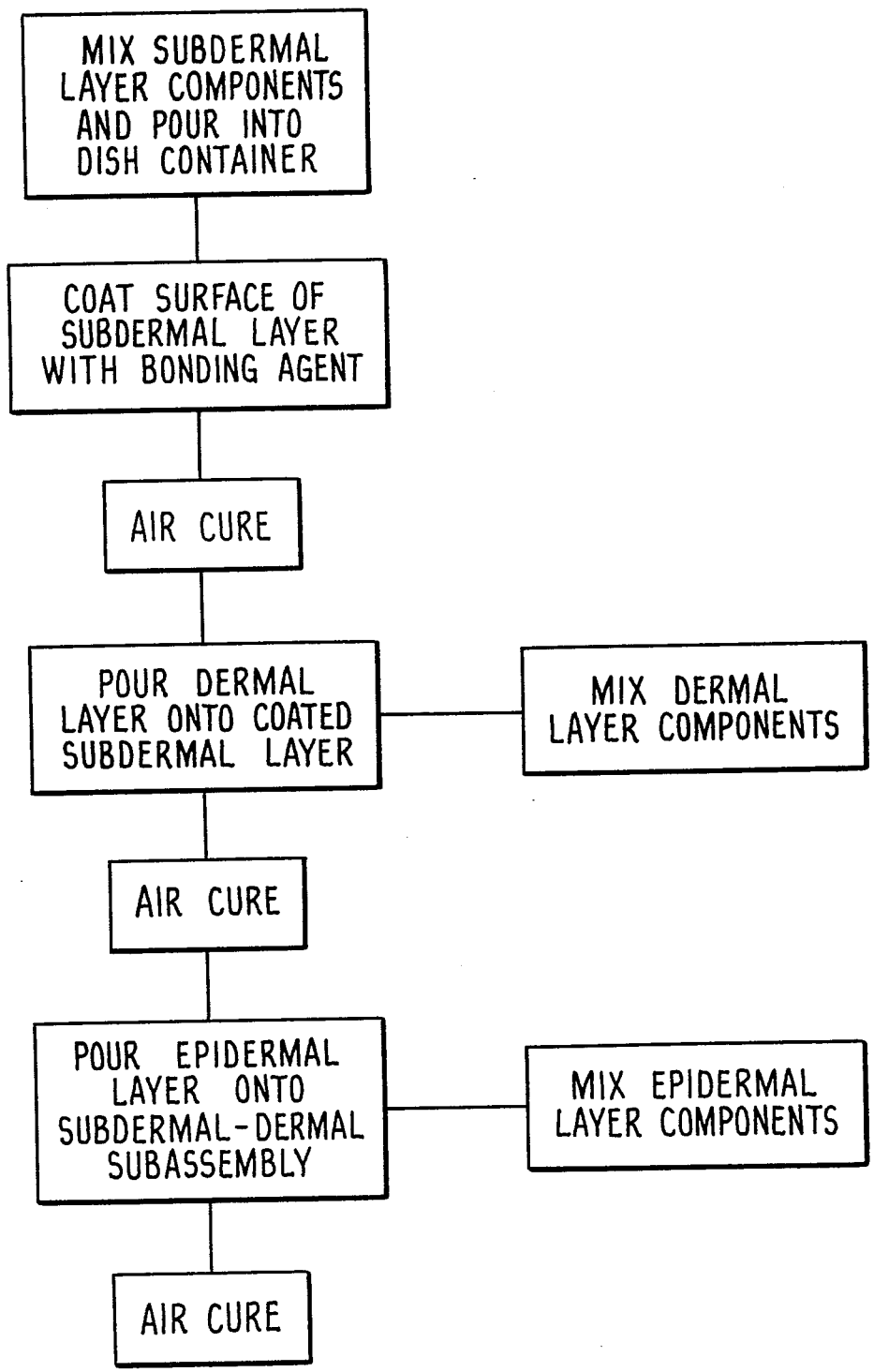
FIG. 4 is a block diagram listing the steps used to manufacture a skin model without simulated dermal defects.
Figure 5:
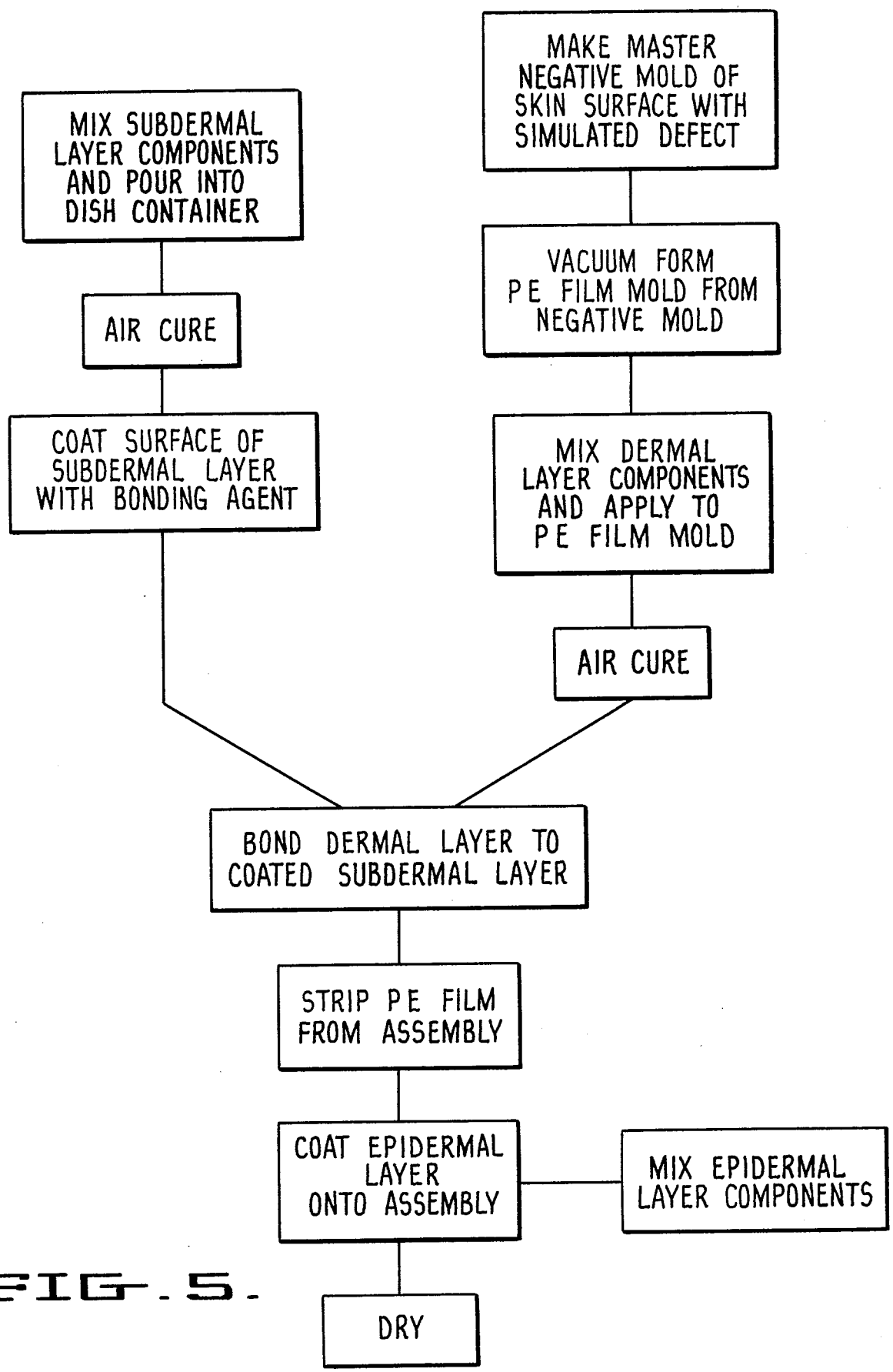
FIG. 5 is a block diagram listing the steps used to manufacture a skin model with simulated dermal defects.

FIGS. 4 and 5 outline embodiments of methods for manufacturing skin models without surface contours and with surface contours, respectively. The method depicted in FIG. 4 basically consists of depositing the layers sequentially in a container to form a composite laminate. In the first step the components of the subdermal layer (uncured elastomer, curing agent, foaming agent) are mixed together and poured into the container which serves as a mold. The next step is coating the surface of the subdermal layer mixture with an immiscible bonding agent. Such a bonding agent layer may be useful to provide structural support and prevent cure inhibition as well as enhance adhesion between the subdermal and dermal layers. The coated subdermal layer is then cured. The curing conditions (time, temperature) will depend upon the elastomer being used. When silicone elastomer is used the layer will typically be cured at room temperature, in air, for about 1 to 2 days. The components of the dermal layer (uncured elastomer, curing agent, fibers, pigment) are then mixed in the proportions that will yield the desired physical properties and appearance and the mixture is poured onto the cured subdermal layer to the desired thickness. The thin supporting overcoat is applied and the layer is then cured under suitable curing conditions. Finally the components of the epidermal layer are mixed and the mixture is poured or painted onto the cured dermal layer. The epidermal layer is allowed to dry under appropriate conditions. The container is then sealed hermetically with a lid or other closure if the model must be stored pending use.

FIG. 5 shows a preferred method for making models having predetermined surface contours that simulate defects that occur in natural skin. In this process a surface contoured dermal layer is formed separately. The series of steps involved in making the subdermal layer is the same as that described with respect to the process shown in FIG. 4 except that a bonding layer is not applied before curing. The manufacture of the contoured dermal layer begins with making a master negative mold. This may be done by sculpting a positive mold from a material such as wax and casting a negative mold therefrom by molding a synthetic resin (eg, epoxy) on the positive mold. A film mold is made from the negative mold by vacuum forming a polymeric sheet (eg, a polyolefin) into the negative mold. The vacuum-formed sheet is peeled off the negative mold and the dermal layer mixture, prepared as described relative to FIG. 4, is poured into the film mold and cured. The film mold-dermal layer assembly is then applied under compression to the subdermal layer which has been coated with a curable adhesive resin. The assembly is then cured to form the high strength bond between the two layers. Finally, the epidermal layer is painted onto the surface of the subdermal-dermal assembly to complete the manufacture of the composite laminate.

The following examples further illustrate the invention. These examples are not intended to limit the invention in any manner.

EXAMPLE 1. MANUFACTURE OF MODEL WITHOUT SURFACE CONTOUR

Ten g of General Electric 615 AB silicone elastomer (9 parts polymer, 1 part curing additive) was mixed with 5 ml of Dow Corning 200 silicone fluid, 2-3 g of a 10:1 by weight mix of Dow Corning Q7-4290 prosthetic foam (a mixture of silicone elastomer and foaming agent) and stannous octoate in a disposable 50 cc cup. The mixture was stirred rapidly to homogeneity. This homogeneous mixture was poured into a 60 mm Petri dish to a depth of 5 mm. A 0.5 mm (2 g) layer of Dow Corning Q3-6550 silicone-xylene dispersion was poured on top of the mixture and the contents of the dish were allowed to cure in air at room termperature for 24 hr.

Ten g of Dow Corning Q3-6527 silicone gel was mixed with 2 g of nylon fibers (mean length ca 3 mm) and 2 g of pigment. This mixture was poured onto the cured contents of the Petri dish to a depth of 2-3 mm. The mixture was allowed to cure at room temperature in air for 24-48 hr.

A mixture of 3 g of Dow Corning Q3-6550 silicone dispersion and 0.5 g of the nylon fibers was then poured onto the cured contents of the dish to a depth of 0.5-1 mm. The mixture was allowed to air dry at room temperature.

EXAMPLE 2. MANUFACTURE OF SKIN MODEL WITH SURFACE CONTOUR

Furrows resembling ie glabellar folds were carved into a block of wax to form a positive mold. A master negative mold was formed from the positive wax mold by pouring epoxy resin (Devcon) onto the wax and allowing it to cure. The epoxy negative mold was separated from the wax and polyethylene film (0.003-0.007 in thick) was vacuum formed onto the negative mold in an oven (180°-220° F.). The mold-film assembly was allowed to cool and the film was peeled from the mold. The silicone gel/nylon fiber/pigment/curing catalyst mixture described in Example 1 was poured into the inverted polyethylene film mold to a depth of about 3 mm. The filled mold was then placed in a curing oven at 100°-125° F. for 1-2 hr.

A 60 mm Petri dish was filled with the mixture of silicone elastomer, silicone fluid, prosthetic foam, and catalyst of Example 1 to a depth of about 3 mm and the mixture was cured in air at 70° F. for 1-4 hr. Following the cure 3 g of Pros-Aid adhesive (an acrylic latex/polyvinylchloride composite) was poured onto the foam layer and the filled polyethylene film mold was applied under compression to the layer in the dish film side up. The resulting assembly was allowed to cure in air at room temperature for 24 hr. The polyethylene film was then stripped off the assembly and two layers of Magan Nusil R-1009 silicone dispersion was painted onto the surface. The surface was cured under an infrared lamp for 30 min after each application. The surface was then coated with acetone primer and Pros-Aid adhesive. Finally an aqueous natural rubber latex (Tab Plastics) containing pigment and nylon fibers was painted onto the surface and the surface was allowed to air dry.

Modifications of the above described modes for carrying out the invention that are obvious to those of skill in polymer chemistry, skin physiology, and/or related fields are intended to be within the scope of the following claims.

We claim:

1. A human skin model for demonstrating or practicing a substantially nonporous structure and made of a silicone gel containing a fibrous reinforcing material; and
   (c) an epidermis-simulating layer about 0.1 to 1 mm thick made of a high tear strength, high tensile strength elastomer, the nature of the interface between the epidermis-simulating layer and the dermis-simulating layer being such as to permit fluid injected into the interface to flow at the interface and distend the epidermis-simulating layer.

2. The human skin model of claim 1 wherein the porosity of the subcutaneous tissue-simulating layer is such as to permit injection of fluid thereinto without causing substantial dimensional changes therein.

3. The human skin model of claim 1 wherein the subcutaneous tissue stimulating layer has a density of about 1 to about 5 lb/ft$^3$, a Durometer hardness in the range of about 1 and about 3 and a compression deflection less than about 1 psi, the dermis-simulating layer has a Durometer hardness in the range of about 2 and about 10 and a penetration value in the range of about 30 and about 100 mm, and the epidermis-simulating layer has a tensile strength in the range of about 3000 and about 4500 psi, and a tear strength in the range of about 110 and about 150 lb/in.

4. The human skin model of claim 1 wherein the superficial surface of the dermis-simulating layer is coated with thin layer of an elastomer having a higher tensile strength, Durometer hardness, elongation, and tear strength than the dermis-simulating layer.

5. The human skin model of claim 1 wherein the dermis-simulating layer is about 1 to 2 mm thick and the epidermis-simulating layer is about 0.1 to 0.5 mm thick.

6. The human skin model of claim 1 wherein the fibrous reinforcing material is nylon fibers and the fibrous reinforcing material is present at a concentration of about 1% to about 20% by weight of the dermis-simulating layer.

7. The human skin model of claim 1 wherein the epidermis-simulating layer also contains the fibrous reinforcing material.

8. The human skin model of claim 1 wherein the dermis-simulating layer also contains a human flesh tone pigment.

9. The human skin model of claim 1 wherein one or more of the layers is contoured so as to simulate a skin contour defect.

10. The human skin model of claim 1 wherein the composite laminate is contained in a dish-like container and the edge of at least the epidermis-simulating layer is bonded to the container wall whereby the surface of the composite laminate is under a slight tension.

11. The human skin model of claim 3 wherein the dermis-simulating layer is about 1 to 2 mm thick, the epidermis-simulating layer is about 0.1 to 0.5 mm thick, the fibrous reinforcing material is nylon fibers and is present in the dermis-simulating layer at a concentration of about 1% to about 20% by weight, the dermis-simulating layer contains a human flesh tone pigment, the epidermis-simulating layer also contains the fibrous reinforcing material, and the superficial surface of the dermis-simulating layer is coated with thin layer of an elastomer having a higher tensile strength Durometer hardness, elongation, and tear strength than the dermis-simulating layer.

* * * * *